United States Patent [19]

Krall

[11] Patent Number: 4,815,955

[45] Date of Patent: Mar. 28, 1989

[54] APPLYING LABELS TO BLOW MOLDED ARTICLES

[75] Inventor: Thomas J. Krall, Toledo, Ohio

[73] Assignee: Owens-Illinois Plastic Products Inc., Toledo, Ohio

[21] Appl. No.: 160,560

[22] Filed: Feb. 25, 1988

[51] Int. Cl.$^4$ .................. B29C 49/24; B29C 49/28
[52] U.S. Cl. ......................... 425/116; 156/572; 156/574; 156/DIG. 24; 156/DIG. 25; 425/117; 425/126.1; 425/127; 425/503; 425/522
[58] Field of Search ............ 425/523, 116, 117, 126.1, 425/127, 503, 522; 156/500, 242, DIG. 25, DIG. 24, DIG. 30, DIG. 31, 569, 574, 570, 572

[56] References Cited

U.S. PATENT DOCUMENTS

| | | | |
|---|---|---|---|
| 4,498,854 | 2/1985 | Ross | 425/522 |
| 4,563,148 | 1/1986 | Hasl et al. | 425/522 |
| 4,585,408 | 4/1986 | Darr | 425/522 |
| 4,616,992 | 10/1986 | Oles | 425/522 |
| 4,639,206 | 1/1987 | Darr | 425/522 |
| 4,721,451 | 1/1988 | Darr | 425/522 |
| 4,729,731 | 3/1988 | Hasl et al. | 425/522 |

Primary Examiner—Willard Hoag

[57] ABSTRACT

In the forming of an article by blow molding parisons into conformity with cavities wherein parisons in the form of tubes are extruded from an extruder into a plurality of neck molds on a head, the head is moved axially away from the extruder to define the parisons and then an array of mold sections are closed about the parisons and the parisons are blown outwardly, the apparatus for applying labels to the hollow blown plastic articles which comprises a vacuum slide mounted for indexing movement adjacent a source of labels for successively removing labels from a source to provide an array of labels on the slide and label pick up and delivery devices on the head for simultaneously removing the array of labels from the vacuum slide and delivering the array of labels to the array of cavities of the mold sections when the head is moved between the mold sections.

4 Claims, 5 Drawing Sheets

APPLYING LABELS TO BLOW MOLDED ARTICLES

This invention relates to the application of labels and particularly to the application of labels to hollow blown plastic articles.

BACKGROUND AND SUMMARY OF THE INVENTION

In the making of hollow blown articles such as containers from plastic material, it has heretofore been suggested that labels be held in the mold sections by vacuum so that when the parison is blown outwardly into conformity with the cavity, the label becomes adhered or bonded to the article.

In one type of apparatus, commonly known as an injection-blow apparatus, parisons in the form of tubes are extruded from an extruder into a neck mold of a head. The head includes label handling vacuum devices which remove labels from magazines and deposit the labels in an array of cavities of mold sections. One of the problems with such an arrangement is that a magazine is required for each of the label handling vacuum devices.

In another type of apparatus such as shown in U.S. Pat. No. 4,636,166, issued Jan. 13, 1987, intermediate endless vacuum belts are provided and indexed past magazines to pick up successively an array of labels and then the label handling vacuum devices on the head remove the array of labels from the endless belts and deposit the labels in the cavities of the mold sections when the head moves down adjacent the extruder. A problem with such an arrangement is that it is necessary to utilize an intermediate belt with the associated maintenance and alignment problems. More specifically, the labels must be held firmly by the belts and this is sometimes difficult with thin, highly flexible labels such as plastic labels. In addition, the endless vacuum belts require different belts and associated vacuum systems for each label size. A further problem with belts is that they require dynamic seals between the belt and source of vacuum. Also belt friction tends to cause improper indexing such that the labels may not be accurately spaced on the belt so that they are properly positioned with respect to the array of mold sections Accordingly, among the objectives of the present invention are to provide an in-mold labeling system which is more accurate, simpler, lower in cost and more reliable and which eliminates the use of endless belts.

In accordance with the invention, a vacuum slide is mounted for indexing movement adjacent a source of labels for successively removing labels from a source to provide an array of labels on said slide and label pick up and delivery devices on the head for simultaneously removing the array of labels from the vacuum slide and delivering the array of labels to the array of cavities of the mold sections when the head is moved between the mold sections.

DESCRIPTION

Figure 4:
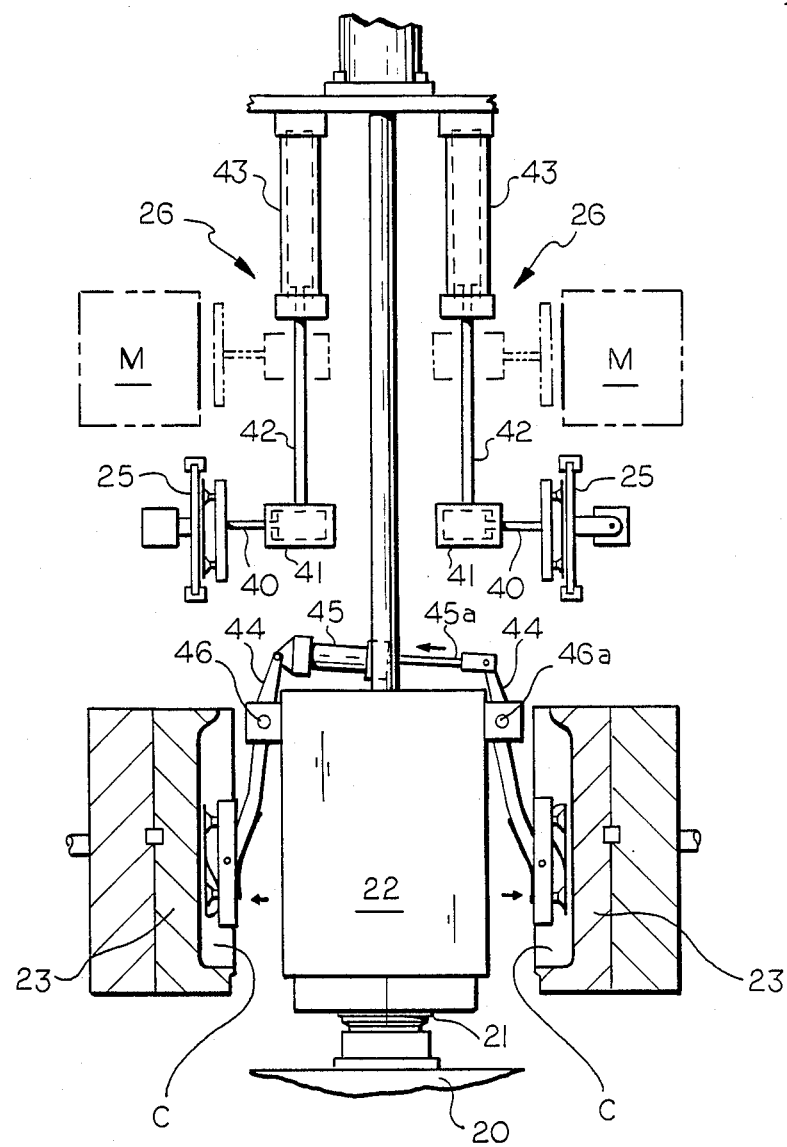
FIG. 4 is a vertical sectional view of a blow molding apparatus to which the invention applies
Figure 5:
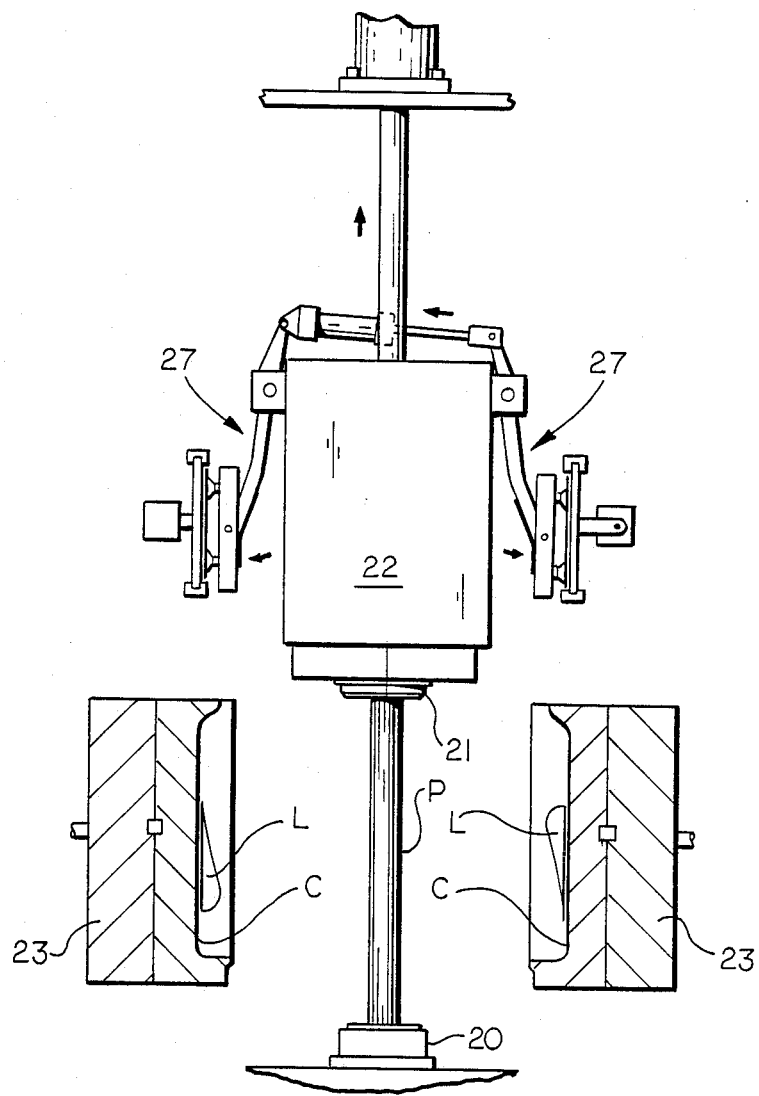
FIG. 5 is a vertical sectional view similar to FIG. 4 showing the apparatus in another position.
Figure 6:
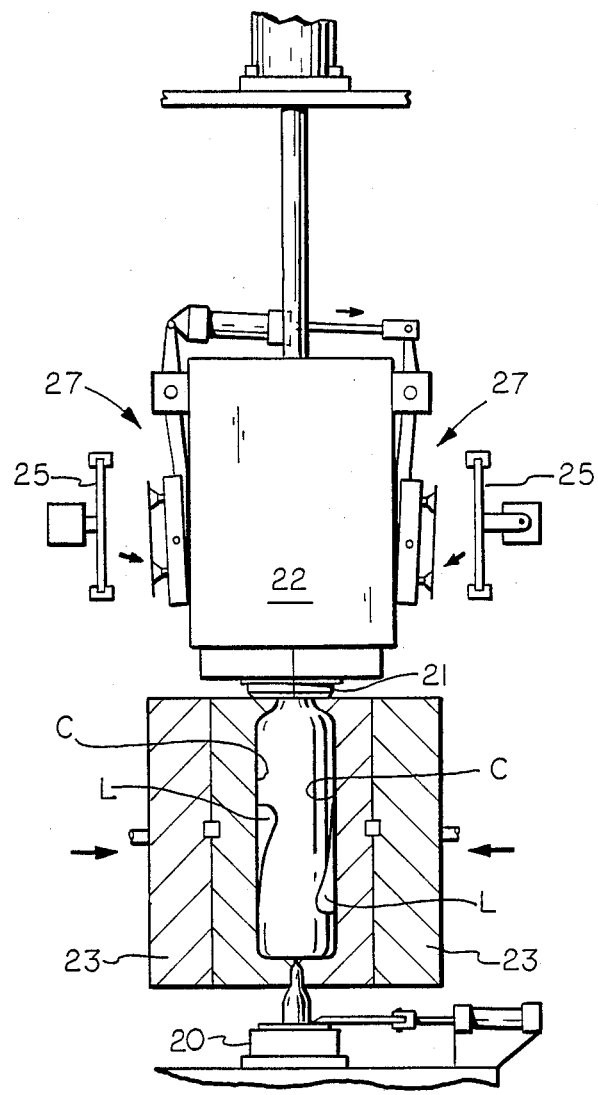
FIG. 6 is a view similar to FIG. 4 showing the apparatus in another position.

Referring to FIGS. 4-6, in one type of blow molding apparatus a parison in the form of a tube is extruded from an extruder 20 into a neck mold 21 of a head 22. As the extrusion continues, the head 22 is moved upwardly to define a tubular parison P. Mold sections 23 providing an array of cavities C are then closed about the parisons and the parisons are blown outwardly (FIG. 6). If labels L are applied to the cavities of the mold sections 23, they become adhered or bonded to the hollow blown article that is formed. A take-out mechanism then engages the articles such as bottles and removes them.

In accordance with the invention, a vacuum slide 25 is mounted for linear movement successively adjacent a source M of labels such as a magazine or other supply, for example, a knife which severs the labels successively from a roll of labels. A pick up and delivery device 26 successively removes a label from the source M and delivers it to the slide 25 as the slide is indexed past the source M to provide an accurately spaced array of labels on the slide 25 (FIG. 4). After the array is on slide 25, vacuum pick up devices 27 on head 22 pick up the labels L from the slide 25 (FIG. 5) and deliver them to the mold cavities C when the head 25 moves downwardly adjacent the extruder 20 (FIG. 4). If labels are to be applied to the cavities of both mold sections 23, a second slide 25 and associated delivery devices 26, 27 are provided.

Figures 1, 2:
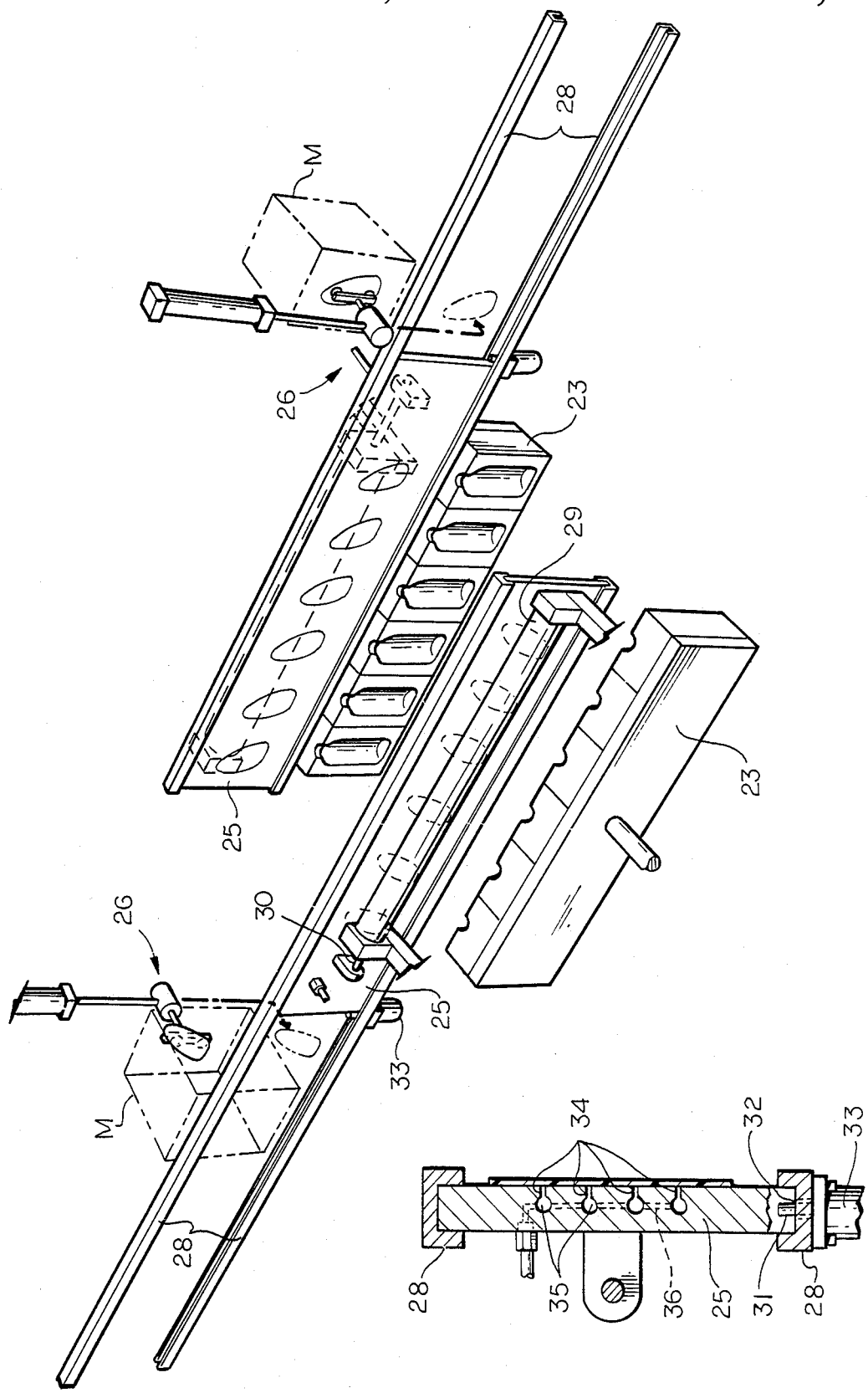
FIG. 1 is a partly schematic exploded perspective view of an apparatus embodying the invention.
FIG. 2 is a sectional view taken along the line 2—2 in FIG. 3.
Figure 3:
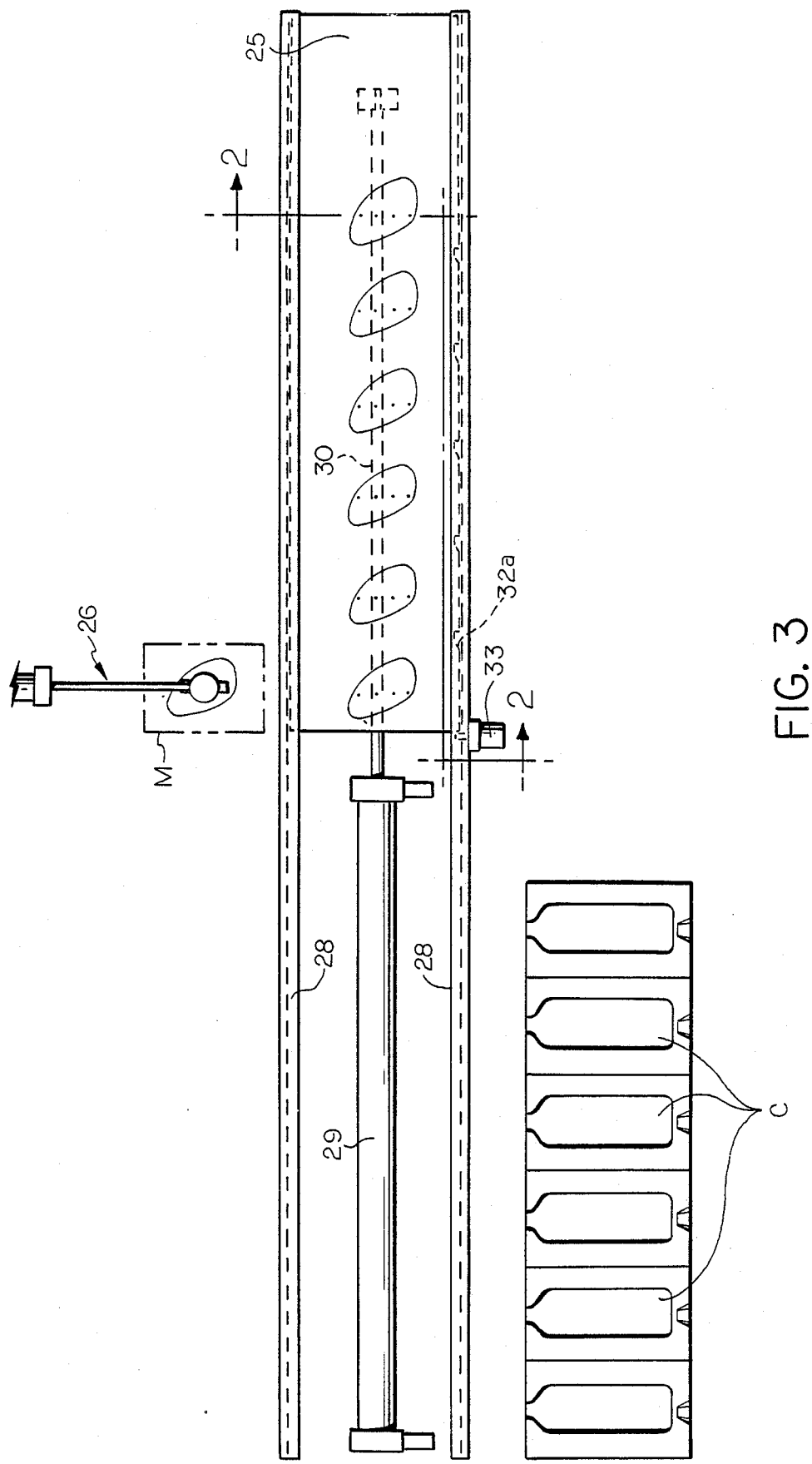
FIG. 3 is a fragmentary side elevational view of a portion of the apparatus.

Each slide 25 is moveable along a track formed by opposed track sections 28 (FIG. 2) by a cylinder 29 that has piston 30 connected to the slide 25. To facilitate proper indexing, a spring loaded stop pin 31 is adapted to engage recesses 32 along a longitudinal edge of slide 25, the recesses 32 corresponding to longitudinal spacing to the spacing of the desired array of labels L. An actuator 33 such as a solenoid is provided for retracting the pin to permit indexing of the slide 25. After retraction, the actuator 32 is de-energized so that the spring loaded stop pin 31 will engage the succeeding recess 32. Recesses are shaped with a tapered wall 32a to facilitate movement of the slide 25.

Each slide 25 further includes a p each mold section 23 in order that labels L may be applied to the cavities C of both mold sections 23 thereby applying two labels L to each hollow article or container.

Each pick up and delivery device 26 for picking up or removing a label from a source M and delivering it to a slide 25 is shown as comprising a vacuum cup mounted on a piston rod 40 of a cylinder head 41 for movement toward and away from the source M and the slide 25. Head 41 is mounted on the shaft of a cylinder actuator 42 for movement between the source M and slide 25.

Each vacuum pick up device 27 comprises an arm 44 pivoted to head 22 supporting vacuum cups. A cylinder 45 has its shaft 46 pivoted to the arms 44 at 46a for moving the vacuum cups transversely relative to the head 22.

It can thus be seen that there has been provided an in-mold labeling system which is more accurate, simpler, lower in cost and more reliable and which eliminates the use of endless belts.

I claim:

1. In apparatus, for blowing molding parisons, having plural mold sections, the improvement, comprising:
   a vacuum slide plate mounted for reciprocal movement between guide means from a position adjacent to supplies of labels to a position adjacent said molds;
   vacuum transfer means for moving said labels from said supplies to said slide plate; and
   vacuum transfer means mounted adjacent said molds for simultaneously removing an array of labels from said slide plate and delivering said array to an array of cavities in said molds.

2. The apparatus set forth in claim 1 including means for indexing said slide plate adjacent said supplies and means for controlling the indexing movement to provide the array of labels.

3. The apparatus set forth in claim 1 including
   a second vacuum slide plate mounted for reciprocal movement between guide means from a position adjacent second supplies of labels to a position adjacent said molds;
   vacuum transfer means for moving said labels from said second supplies to said second slide plate; and
   vacuum transfer means mounted adjacent said molds for simultaneously removing an array of labels from said second slide plate and delivering said array to another array of cavities in said molds.

4. The apparatus set forth in claim 1 wherein said vertical slide plate is movably supported top and bottom by guide tracks and defines a plurality of vacuum openings along a generally flat surface thereof.

* * * * *